United States Patent
Keil

(10) Patent No.: US 6,340,081 B1
(45) Date of Patent: Jan. 22, 2002

(54) SHOCK ABSORBER HAVING PORTED PLATE LOW SPEED TUNABILITY

(75) Inventor: Daniel Keil, Temperance, MI (US)

(73) Assignee: Tenneco Automotive Inc., Lake Forest, IL (US)

( * ) Notice: Subject to any disclaimer, the term of this patent is extended or adjusted under 35 U.S.C. 154(b) by 0 days.

(21) Appl. No.: 09/603,444

(22) Filed: Jun. 23, 2000

(51) Int. Cl.⁷ .................................................. F16F 9/34
(52) U.S. Cl. ........................... 188/322.15; 188/322.13; 188/322.22
(58) Field of Search ........................ 188/322.22, 322.15, 188/280, 281, 282.1, 282.5, 282.6, 316, 317, 322.13

(56) References Cited

U.S. PATENT DOCUMENTS

| | | | |
|---|---|---|---|
| 2,637,414 A | * 5/1953 | Patriquin | 188/100 |
| 2,732,039 A | 1/1956 | Funkhouser et al. | |
| 2,740,500 A | * 4/1956 | Brundrett et al. | 188/88 |
| 3,199,638 A | * 8/1965 | Otomo | 188/100 |
| 4,060,155 A | 11/1977 | Duckett | |
| 4,113,072 A | * 9/1978 | Palmer | 188/282 |
| 4,203,507 A | * 5/1980 | Tomita et al. | 188/317 |
| 4,352,417 A | * 10/1982 | Stinson | 188/322.15 |
| 4,401,196 A | 8/1983 | Grundei | |
| 4,484,669 A | 11/1984 | Kato | |
| 4,610,332 A | 9/1986 | Mourray | |
| 4,821,852 A | * 4/1989 | Yokoya | 188/322.15 |
| 4,834,222 A | 5/1989 | Kato et al. | |
| 4,895,229 A | 1/1990 | Kato | |
| 4,964,493 A | * 10/1990 | Yamaura et al. | 188/322.15 |
| 4,972,929 A | 11/1990 | Ivers et al. | |
| 5,085,300 A | * 2/1992 | Kato et al. | 188/322.15 |
| 5,129,488 A | 7/1992 | Furuya et al. | |
| 5,148,897 A | * 9/1992 | Vanroye | 188/322.22 |
| 5,316,113 A | 5/1994 | Yamaoka | |
| 5,325,942 A | 7/1994 | Groves et al. | |
| 5,332,069 A | 7/1994 | Murakami | |
| 5,413,195 A | 5/1995 | Murakami | |
| 5,529,154 A | * 6/1996 | Tanaka | 188/322.15 |
| 5,615,756 A | 4/1997 | Grundei et al. | |
| 5,755,305 A | * 5/1998 | Deferme et al. | 181/237 |
| 5,769,190 A | 6/1998 | Deferme | |
| 5,823,306 A | 10/1998 | de Molina | |
| 5,921,360 A | * 7/1999 | Moradmand | 188/322.22 |
| 6,202,805 B1 | * 3/2001 | Okada et al. | 188/266.2 |
| 6,230,858 B1 | * 5/2001 | Moradmand et al. | 188/322.13 |

* cited by examiner

Primary Examiner—Christopher P. Schwartz
Assistant Examiner—Benjamin A. Pezzlo
(74) Attorney, Agent, or Firm—Harness, Dickey & Pierce, PLC

(57) ABSTRACT

A single absorber includes a valve assembly with a low speed valving system and a high speed valving system. Both systems control fluid flow through the respective valve assembly for fluid flow in the same direction. The low speed valving system is independently tunable in order to provide low speed damping to improve both vehicle control and handling. The independent tuning of the low speed valving system allows the optimization of the low speed valving system in relation to the high speed valving system as well as independent tuning of the high speed valving system in relation to the low speed valving system. The independent tuning of the two systems allow the achievement of a smooth transition between the two systems. The two valving systems can be incorporated into a piston assembly for an extension stroke, a base valve assembly for a compression stroke or both.

13 Claims, 5 Drawing Sheets

SHOCK ABSORBER HAVING PORTED PLATE LOW SPEED TUNABILITY

FIELD OF THE INVENTION

The present invention relates generally to automotive dampers or shock absorbers which receive mechanical shock. More particularly, the present invention relates to a unique hydraulic valve assembly which allows greater tunability of the shock absorber, especially in the mode of low speed or low hydraulic fluid flow.

Shock absorbers are used in conjunction with automotive suspension systems to absorb unwanted vibrations which occur during driving. To absorb these unwanted vibrations, shock absorbers are generally connected between the sprung portion (body) and the unsprung portion (wheels) of the automobile. A piston is located within a working chamber defined by a pressure tube of the shock absorber, with the piston being connected to the sprung portion of the automobile through a piston rod. The pressure tube is connected to the unsprung portion of the vehicle by one of the methods known in the art. Because the piston is able, through valving, to limit the flow of damping fluid between opposite sides of the piston when the shock absorber is compressed or extended, the shock absorber is able to produce a damping force which damps the unwanted vibration which would otherwise be transmitted from the unsprung portion to the sprung portion of the automobile. In a dual tube shock absorber, a fluid reservoir is defined between the pressure tube and the reserve tube. A base valve can be located between the lower portion of the working chamber (the area below the piston) and the reservoir to limit the flow of fluid between the lower working chamber and the reservoir. When both piston valving and a base valve are utilized, the piston valving produces a damping force which counteracts the unwanted vibrations during an extension stroke of the shock absorber and the base valve produces a damping force which counteracts the unwanted vibrations during a compression stroke of the shock absorber. The greater degree to which the flow of fluid within the shock absorber is restricted by the piston valving and the base valve, the greater the damping forces which are generated by the shock absorber. Thus, a highly restricted flow of fluid would produce a firm ride while a less restrictive flow of fluid would produce a soft ride.

In selecting the amount of damping that a shock absorber is to provide, at least three vehicle performance characteristics are considered. These three characteristics are ride comfort, vehicle handling and road holding ability. Ride comfort is often a function of the spring constant for the main springs of the vehicle as well as the spring constant for the seat and tire and the damping coefficient of the shock absorber. For optimum ride comfort, a relatively low damping force or a soft ride is preferred.

Vehicle handling is related to the variation in the vehicle's attitude (i.e., roll, pitch and yaw). For optimum vehicle handling, relatively large damping forces, or a firm ride, are required to avoid excessively rapid variations in the vehicle's attitude during cornering, acceleration and deceleration.

Finally, road handling is generally a function of the amount of contact between the tires and the ground. To optimize road handling ability, large damping forces, or a firm ride, are required when driving on irregular surfaces to prevent loss of contact between the wheel and the ground for excessive periods of time.

Various types of shock absorbers have been developed to generate the desired damping forces in relation to the various vehicle performance characteristics. Shock absorbers have been developed to provide different damping characteristics depending upon the speed or acceleration of the piston within the pressure tube. Because of the exponential relation between pressure drop and flow rate, it is a difficult task to obtain a damping force at relatively low piston velocities, particularly at velocities near zero. Low speed damping force is important to vehicle handling since most vehicle handling events are controlled by low speed vehicle body velocities.

Various prior art systems for tuning shock absorbers during low speed movement of the piston create a fixed low speed bleed orifice which provides a bleed passage which is always open across the piston. This bleed orifice can be created by utilizing orifice notches positioned either on the flexible disc adjacent to the sealing land or by utilizing orifice notches directly in the sealing land itself. The limitations of these designs is that because the orifice is constant in cross-sectional area, the created damping force is not a function of the internal pressures of the shock absorber. In order to obtain the low speed control utilizing these open orifice notches, the orifice notches have to be small enough to create a restriction at relatively low velocities. When this is accomplished, the low speed fluid circuit of the valving system will operate over a very small range in velocity. Therefore, the secondary or high-speed stage valving is activated at a lower velocity than is desired. Activation of the secondary valving at relatively low velocities creates harshness because the shape of the fixed orifice bleed circuit force velocity characteristic is totally different than the shape of the high speed circuit.

Prior art attempts at overcoming the problems of fixed orifice bleed valving and thus eliminate harshness during low speed piston movements have included the incorporation of a variable orifice bleed valving circuit. As the velocity of the piston increases, the flow area of the variable orifice also increases to smooth the transition to the secondary valving. These prior art variable orifice bleed valving circuits are typically located at the outer periphery of the flexible valve disc and thus they are dependent on the diameter of the disc to determine the rate at which the flow area increases. As the diameter of the flexible disc increases, it becomes more difficult to control the rate at which the flow area of the orifice increases. Since the flow area is increased by the deflection of the variable orifice bleed disc, a small deflection in a large diameter variable orifice bleed disc provides a rapid increase in the flow area of the bleed orifice. This rapid increase in the flow area complicates the tuning between the low speed valving circuit and the secondary or high-speed valving circuit.

Still other prior art systems have developed variable bleed valving circuits which are integrated with the mid/high-speed valving systems. The integration of the low speed circuit with the mid/high speed circuit creates a system where the tuning of the low speed circuit affects the mid/high-speed circuit and the tuning of the mid/high-speed circuit affects the low speed circuit.

The continued development of shock absorbers includes the development of a valving system which can provide a smooth transition between a low speed valving circuit and the secondary or high speed valving circuit. The smooth transition between these two circuits helps to reduce and/or eliminate any harshness during transition. In addition to the smooth transition, the development of these systems has also been directed towards the separation of these two circuits in order to be able to independently tune each of these circuits.

SUMMARY OF THE INVENTION

The present invention provides the art with a method for independently tuning damping forces at low piston velocities in order to improve the handling characteristics of the vehicle without creating harshness. The present invention provides a low speed variable orifice bleed circuit which is separate from the mid/high-speed circuit of the secondary valving system. The secondary valving system of the present invention includes a first disc secured to the piston to close the mid/high-speed extension passages extending through the piston. The first disc deflects due to a pressure differential to open the mid/high-speed extension fluid passages during the second storage valving. The low speed variable orifice bleed circuit of the present invention includes a plurality of discs secured to the piston but separate from the first disc. The second plurality of discs close the low speed extension fluid passages extending through the piston. The second plurality of discs also deflect due to a pressure differential to open the low speed extension fluid passages during the initial stage valving. The separation of these two valving systems allows the designer to separately optimize the tuning of each valving system to optimize the tuning of each varying system to optimize the damping forces created by the shock absorber during an extension stroke and thus improve the vehicle handling without creating harshness. A similar dual valving system can be incorporated into the base valve of the present invention to optimize the damping forces created during a compression stroke.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
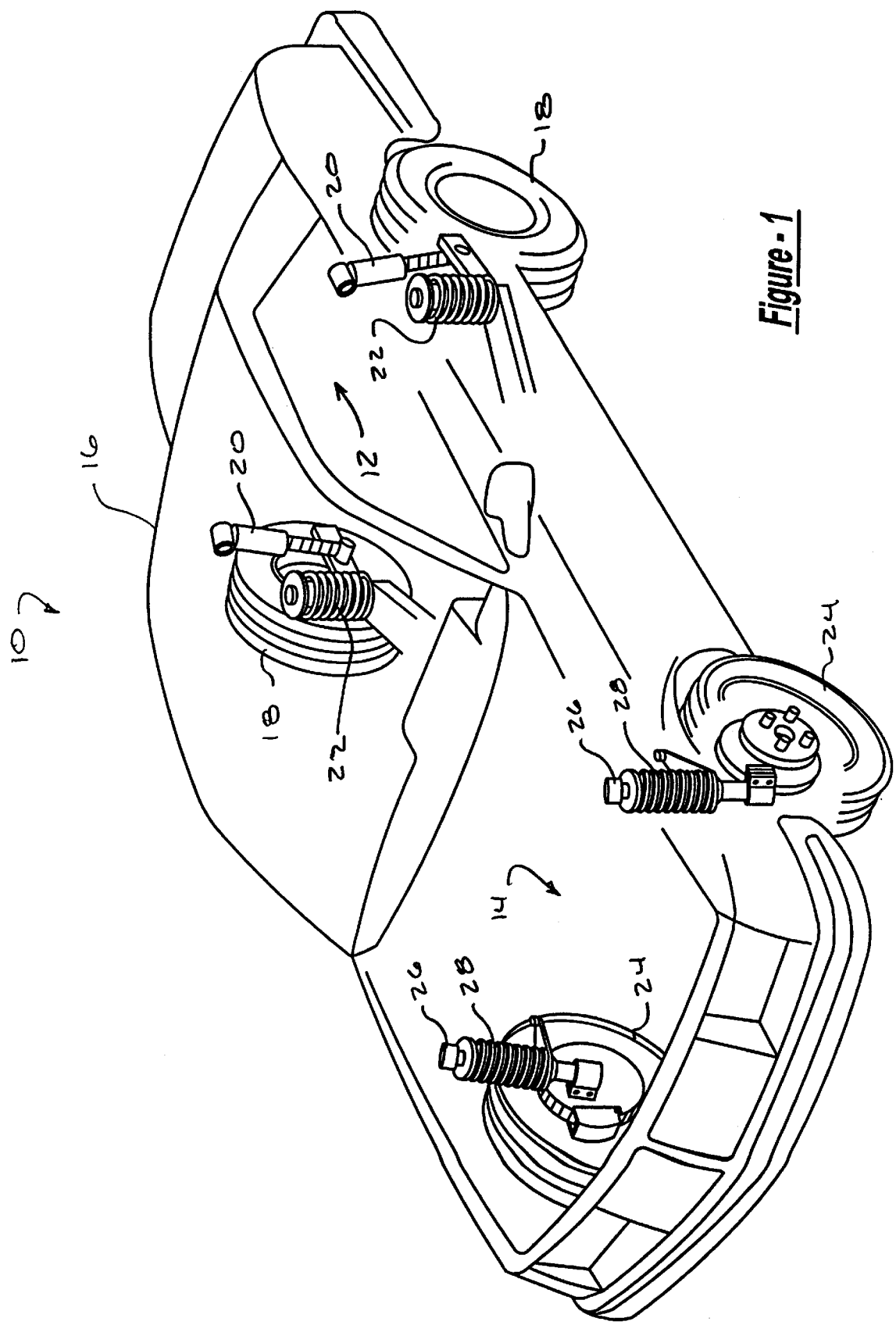
FIG. 1 is an illustration of an automobile using the variable bleed orifice in accordance with the present invention.

Referring now to the drawings in which like reference numerals designate like or corresponding parts throughout the several views, there is shown in FIG. 1 a vehicle incorporating a suspension system having the independent variable bleed orifice in accordance with the present invention which is designated generally by the reference numeral 10. Vehicle 10 includes a rear suspension 12, a front suspension 14 and a body 16. Rear suspension 12 has a traversely extending rear axle assembly (not shown) adapted to support the vehicles rear wheels 18. The rear axle is operatively connected to body 16 by a pair of shock absorbers 20 and a pair of helical coil springs 22. Similarly, front suspension 14 includes a traversely extending front axle assembly (not shown) to operatively support the vehicle's front wheels 24. The front axle assembly is operatively connected to body 16 by means of a second pair of shock absorbers 26 and by a pair of helical coil springs 28. Shock absorbers 20 and 26 serve to dampen the relative motion of the unsprung portion (i.e., front and rear suspensions 12 and 14, respectively) and the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating independent front and/or independent rear suspension systems. Further, the term "shock absorber" as used herein is meant to refer to dampers in general and thus will include McPherson struts.

Figure 2:
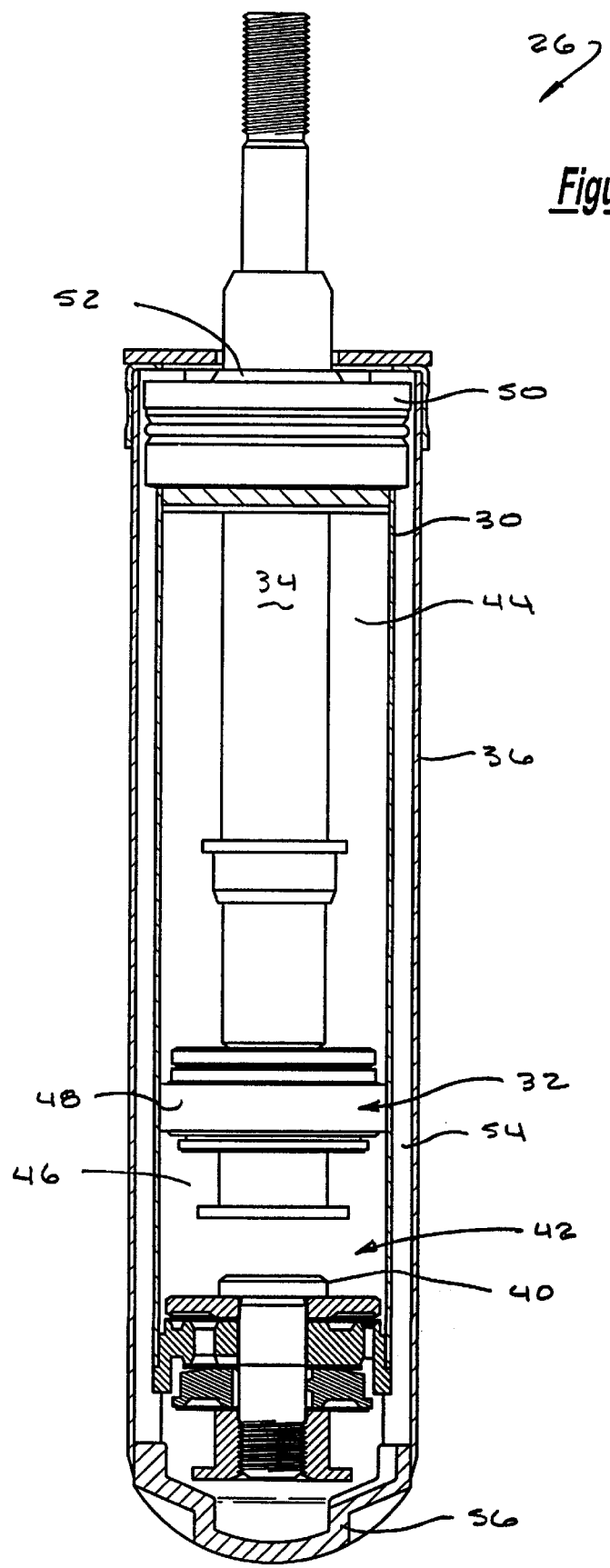
FIG. 2 is a side view, partially in cross-section of a shock absorber incorporating the independent variable bleed orifice in both the piston valving system and the base valving system in accordance with the present invention.

Referring now to FIG. 2, shock absorber 26 is shown in greater detail. While FIG. 2 shows only shock absorber 26, it is to be understood that shock absorber 20 also includes the variable bleed orifice valving in accordance with the present invention which is described below for shock absorber 26. Shock absorber 20 differs from shock absorber 26 in the way which it is adapted to be connected to the sprung and unsprung portions of vehicle 10. Shock absorber 26 comprises a pressure tube 30, a piston assembly 32, a piston rod 34, a reservoir tube 36 and a base valve assembly 40.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating unique functional forces as well as sealing upper working chamber 44 from lower working chamber 46. Piston rod 34 is attached to piston assembly 32 and extends through upper working chamber 44 and through an upper end cap 50 which closes the upper end of both pressure tube 30 and reservoir tube 36. A sealing system 52 seals the interface between upper end cap 50, pressure tube 30, reservoir tube 36 and piston rod 34. The end of piston rod 34 opposite to piston assembly 32 is adapted, in the preferred embodiment, to be secured to the sprung portion of vehicle 10. Valving in piston assembly 32 controls the movement of fluid between upper working chamber 44 and lower working chamber 46 during movement of piston assembly 32 within pressure tube 30. Because piston rod 34 extends only through upper working chamber 44 and not lower working chamber 46, movement of piston assembly 32 with respect to pressure tube 30 causes a difference in the amount of fluid displaced in upper working chamber 44 than the amount of fluid displaced in lower working chamber 46. This difference in the amount of fluid displaces is known as the "rod volume" and it flows through base valve assembly 40.

Reservoir tube 36 surrounds pressure tube 30 to define a reserve chamber 54 located between the tubes. The bottom of reservoir tube 36 is closed by an end cap 56 which is adapted, in the preferred embodiment, to be connected to the unsprung portion of vehicle 10. The upper end of reservoir tube 36 is attached to upper end cap 50. Base valve assembly 40 is disposed between lower working chamber 46 and reserve chamber 54 to control the flow of fluid between the two chambers. When shock absorber 26 extends in length (rebound), an additional volume of fluid is needed in lower working chamber 46 due to the "rod volume" concept. Thus, the fluid will flow from reserve chamber 54 to lower working chamber 46 through base valve assembly 40. When shock absorber 26 compresses in length (compression), an excess of fluid must be removed from lower working chamber 46 due to the "rod volume" concept. Thus, fluid will flow from lower working chamber 46 to reserve chamber 54 through base valve assembly 40.

The present invention is directed to a unique piston assembly 32 and base valve assembly 40 each of which includes variable bleed orifice valving for rebound or extension strokes which is independent of the mid/high-speed valving. Piston assembly 32 provides an independent tunable smooth transition between the low speed valving and the mid/high speed valving in a rebound movement of shock absorber 26. The damping characteristics for a compression movement are determined by base valve assembly 40 as detailed below.

Figure 3:
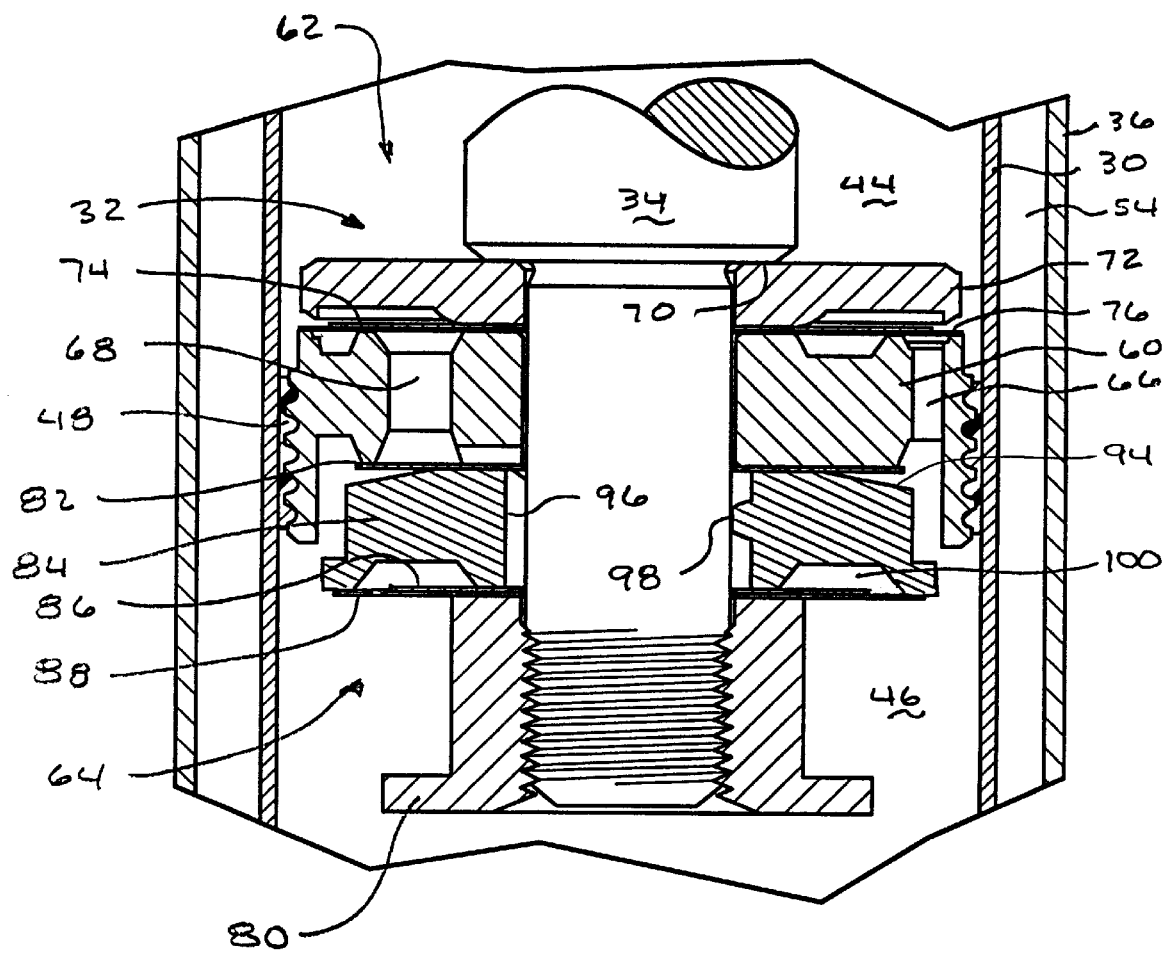
FIG. 3 is an enlarged side elevational view, partially in cross-section, of the piston assembly for the shock absorber shown in FIG. 2.
Figure 4:
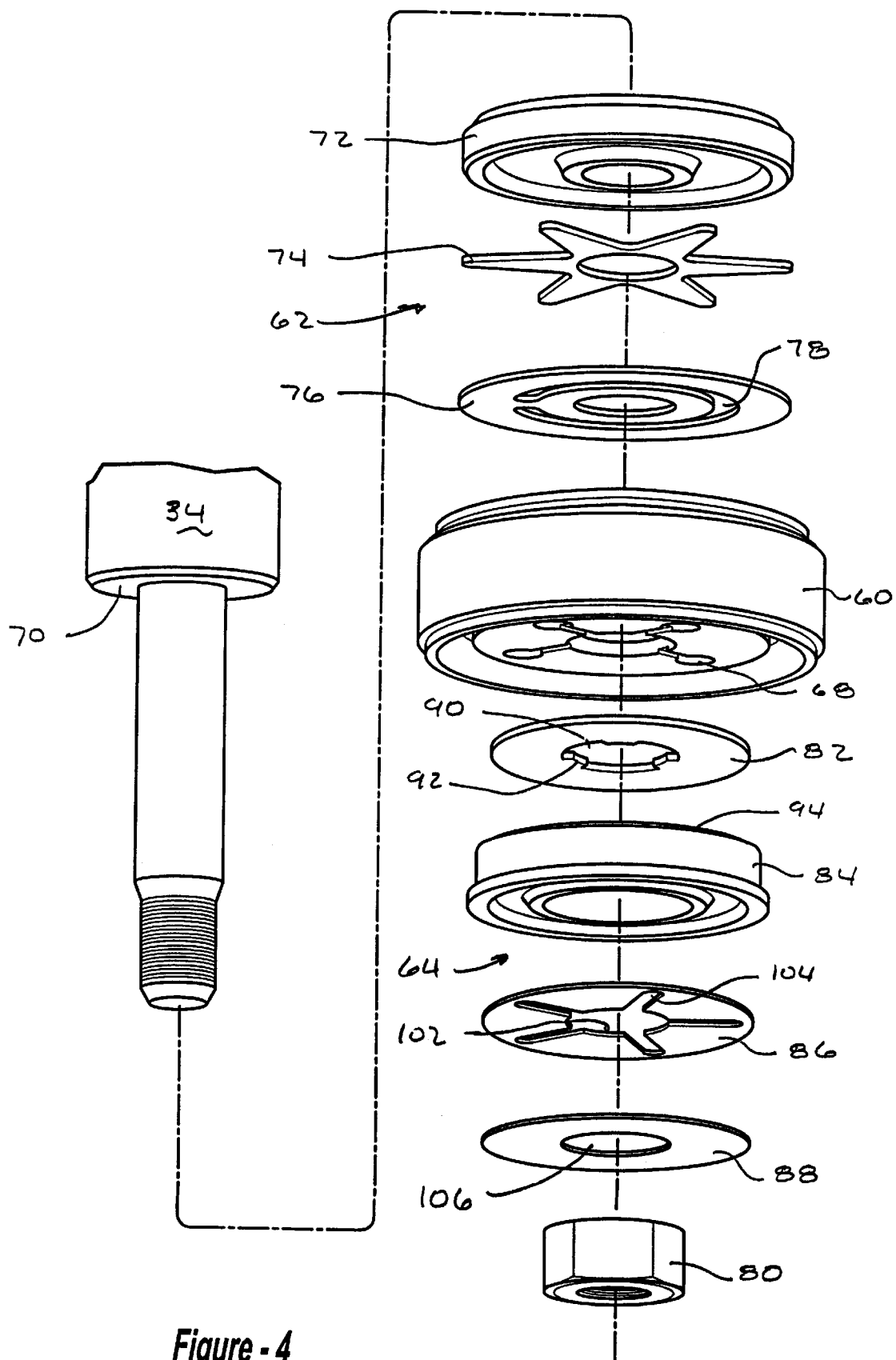
FIG. 4 is an exploded perspective view of the piston assembly shown in FIG. 3.

Referring now to FIGS. 3 and 4, piston assembly 32 comprises a piston 60, a compression valve assembly 62 and a rebound valve assembly 64. Piston 60 is secured to piston rod 34 and it defines a plurality of compression fluid passages 66 and a plurality of rebound passages 68.

Compression valve assembly 62 is disposed on the upper side of piston 60 adjacent shoulder 70 defined by piston rod 34. Compression valve assembly 62 comprises a support washer 72, an intake spring 74 and an intake valve 76. Support washer 72 is disposed adjacent shoulder 70 with intake spring 74 being disposed adjacent support washer 72 and intake valve 76 being disposed between intake spring 74 and piston 60. Intake spring 74 is a star shaped flat metal spring which provides support for intake valve 76 as well as providing flow paths for the fluid within upper chamber 44 to flow into rebound passages 68. Intake valve 76 covers the plurality of compression fluid passages 66 and it defines a flow passage 78 for providing fluid flow from upper working chamber 44 to rebound passages 68. During a compression stroke for shock absorber 10, fluid pressure increases in lower working chamber 46 and decreases in upper working chamber 44. The increase in fluid pressure in lower chamber 46 is transferred through compression fluid passages 66 to exert a load on intake valve 76. As fluid pressure increases in lower working chamber 46 and the pressure differential across intake valve 76 increases, intake valve 76 will deflect intake spring 74 to allow fluid to flow between lower working chamber 46 and upper working chamber 44. Compression valve assembly 62 does not determine the damping characteristics for shock absorber 10 during a compression stroke. Base valve assembly 40 performs this function. Compression valve assembly 62 functions as a one-way valve to replace fluid within upper working chamber 44 during a compression stroke and to close rebound passages 68 during a rebound stroke.

Rebound valve assembly 64 is disposed on the lower side of piston 60. A retaining nut 80 is threaded onto piston rod 34 to retain the assembly of piston assembly 32 and piston rod 34. Rebound valve assembly 64 comprises a high speed valve disc 82, a ported plate 84, a bleed disc 86 and a low speed valve disc 88. High speed valve disc 82 is disposed adjacent piston 60 and it closes the plurality of rebound passages 68. High speed valve disc 82 defines a central aperture 90 which includes a plurality of tabs 92. Tabs 92 center high speed valve disc 82 on piston rod 34 while still allowing fluid flow through central aperture 90. Ported plate 84 is disposed adjacent high speed valve disc 82 and it defines a contoured surface 94 which controls the flexing of high speed valve disc 82. Ported plate 84 defines a central aperture 96 which includes a plurality of tabs 98. Tabs 98 center ported plate 84 on piston rod 34 while still allowing fluid flow through central aperture 96 around piston rod 34.

Bleed disc 86 is disposed adjacent ported plate 84 and with ported plate 84 defines a closed low speed pressure chamber 100. Bleed disc 86 defines a central aperture 102 and a plurality of bleed slots 104 extending radially outward from aperture 102. Bleed slots 104 define a fluid flow path such that fluid in upper working chamber 44 is in communication with low speed pressure chamber 100 through intake spring 74, flow passage 78 in intake valve 76, extension passages 68, aperture 90, aperture 96 and slots 104. Low speed valve disc 88 is disposed adjacent bleed disc 86 and it defines a central aperture 106. Low speed valve disc 88 closes bleed slots 104 and thus seals low speed pressure chamber 100. Retaining nut 80 is disposed adjacent low speed valve disc 88 and it secures piston assembly 32 to piston rod 34.

During a rebound stroke for shock absorber 26, fluid pressure decreases in lower working chamber 46 and fluid pressure increases in upper working chamber 44. The increase in fluid pressure in upper working chamber 44 is transferred through intake spring 74, flow passage 78 in intake valve 76, through passages 68 to exert a load on high speed valve disc 82. The increase in fluid pressure is also transferred through aperture 90, aperture 96 and slots 104 into chamber 100 where it exerts a load on low speed valve disc 88. Low speed valve disc 88 is designed to deflect at a lower load than high speed valve disc 82 and thus will deflect first to allow fluid flow between upper working chamber 44 and lower working chamber 46 during low speed movements of piston 60 when relatively low pressure differentials across disc 88 exist. In addition, the low speed pressure area of disc 88 defined by chamber 100 is greater than the high speed pressure area of disc 82 defined by passages 68. This larger pressure area allows rebound valve assembly 64 to produce a soft blow-off characteristic. This feature is beneficial to vehicle 10 since low speed control force improves vehicle handling and the soft blow-off reduces harshness experienced by the vehicle passengers.

As the pressure differentials across low speed valve disc 88 continues to increase, disc 88 will deflect an additional amount to increase the fluid flow between upper working chamber 44 and lower working chamber 46. The amount of deflection and thus the metering for the fluid flow is controlled by the size of bleed slots 104. Eventually, as the speed of movement of piston 60 increases, the bleed flow of fluid will reach a saturation point due to bleed slots 104 and the pressure differential across high speed valve disc 82 (which is the same pressure differential across disc 88) will increase and exert a sufficient load against high speed valve disc 82 to cause deflection of high speed valve disc 82 to allow additional flow of fluid between upper working chamber 44 and lower working chamber 46. The transition between the fluid flow past disc 88 and the fluid flow past disc 82 can be controlled by the design of ported plate 84, bleed disc 86 and low speed valve disc 88. Factors that will affect the shape of the transition curve include but are not limited to the diameter of ported plate 84, the size of bleed slots 104, the diameter and thickness of bleed disc 86 and the diameter and size of low speed valve disc 88. All of the factors which control the shape of the transition curve are independent of the design of piston 60 and high speed valve disc 82. Thus, the tuning of the transition between low speed valving and mid/high speed valving is independent from the mid/high speed valving, thus allowing the independent tuning of both valve systems.

Figure 5:
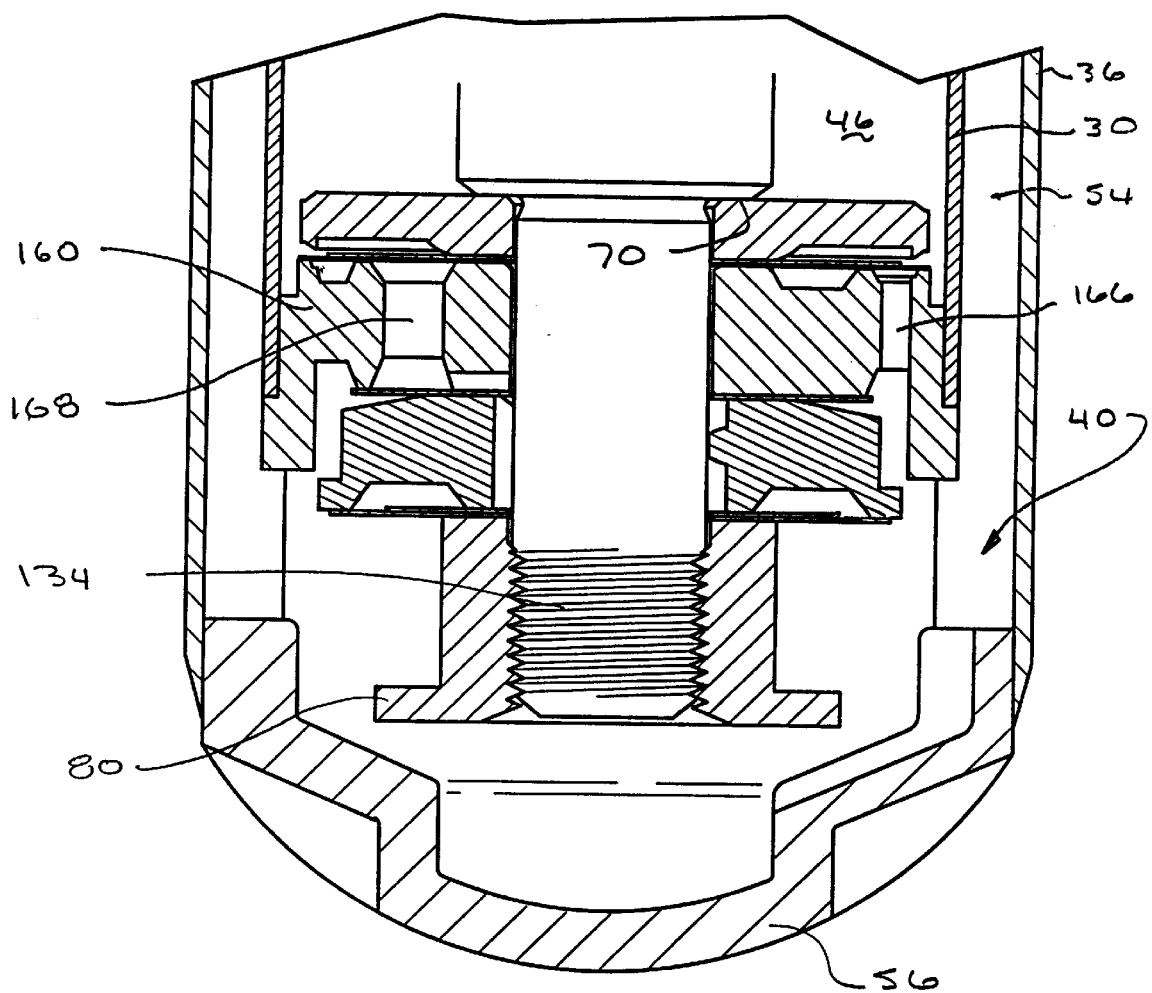
FIG. 5 is an enlarged side elevational view, partially in cross-section, of the base valve assembly for the shock absorber shown in FIG. 1.

Referring now to FIG. 5, base valve assembly 40 is illustrated. Base valve assembly 40 is disposed between lower working chamber 46 and reserve chamber 54. Thus, base valve assembly provides damping characteristics for shock absorber 10 during a compression stroke in a manner identical to that described above for rebound valve assembly 64 during a rebound stroke. Base valve assembly 40 comprises a valve body 160, a threaded retainer 134, nut 80, high speed valve disc 82, ported plate 84, bleed disc 86 and low speed valve disc 88.

Valve body 160 is identical to piston 60 except that it is adapted to be secured to pressure tube 30 instead of piston rod 34. In addition, the plurality of compression fluid passages 66 in piston 60 become the plurality of rebound passages 166 in valve body 160 and the plurality of rebound passages 68 in piston 60 become the plurality of compression passages 168 in valve body 160. Threaded retainer 134 is identical to the end of piston rod 34 in that it defines shoulder 70 and threadingly accepts nut 80 to keep the components of bleed valve assembly 40 together.

The function and operation of base valve assembly 40 is the same as that described above for piston assembly 32 except that base valve assembly 40 creates a damping load during a compression stroke and has a check valve for replacing fluid in lower working chamber 46 in an extension stroke. Base valve assembly 40 operates to create a damping force during a compression stroke due to its positioning between lower working chamber 46 and reserve chamber 54. The features and advantages described above for piston assembly 32 in an extension stroke apply equally well for base valve assembly 40 during a compression stroke.

While the above detailed description describes the preferred embodiment of the present invention, it should be understood that the present invention is susceptible to modification, variation and alteration without deviating from the scope and fair meaning of the subjoined claims.

What is claimed is:

1. A damper comprising:
   a pressure tube forming a working chamber;
   a piston rod extending into said working chamber;
   a piston assembly attached to said piston rod and disposed within said working chamber, said piston assembly dividing said working chamber into an upper working chamber and a lower working chamber, said piston assembly comprising:
   a piston defining a rebound fluid passage extending between said upper and lower working chambers;
   a rebound valve assembly attached to said piston for controlling fluid flow through said rebound fluid passage;
   a rebound bleed valve assembly attached to said piston rod for bypassing said rebound valve assembly, said rebound bleed valve assembly including a ported plate disposed adjacent said rebound valve assembly, said ported plate and said piston rod defining a rebound bleed passage extending between said upper and lower working chambers, said rebound bleed valve assembly further comprising a rebound bleed disc disposed adjacent said ported plate, said rebound bleed disc defining at least one slot in communication with said rebound bleed passage for limiting fluid flow through said rebound bleed valve assembly for tuning said damper.

2. The damper according to claim 1 wherein said rebound bleed valve assembly includes a rebound low speed valve disc disposed adjacent said rebound bleed disc, said rebound low speed valve disc and said ported plate defining a chamber in communications with said at least one slot defined by said rebound bleed disc, deflection of said rebound low speed valve disc being controlled by said at least one slot defined by said rebound bleed disc.

3. The damper according to claim 1 further comprising:
   a reservoir tube disposed around said pressure tube, said reservoir tube forming a reserve chamber between said pressure tube and said reservoir tube; and
   a compression valve assembly disposed between said lower working chamber and said reserve chamber, said compression valve assembly defining a compression fluid passage extending between said lower working chamber and said reserve chamber.

4. The damper according to claim 3 wherein said compression valve assembly includes a valve body attached to said pressure tube, said valve body defining said compression fluid passage.

5. The damper according to claim 3 further comprising a compression bleed valve assembly defining a compression bleed passage extending between said lower working chamber and said reserve chamber, said compression bleed valve assembly controlling fluid flow through said compression bleed passage, said compression bleed valve assembly being independent from said compression valve assembly.

6. The damper according to claim 5 wherein said compression bleed valve assembly is attached to said compression valve assembly.

7. The damper according to claim 5 wherein said compression bleed assembly includes a compression metering device for limiting fluid flow through said compression bleed valve assembly for tuning said damper.

8. The damper according to claim 7 wherein said metering device is a compression bleed disc.

9. The damper according to claim 8 wherein said compression bleed valve assembly includes a compression low speed valve disc, deflection of said compression low speed valve disc being controlled by said compression bleed disc.

10. The damper according to claim 8 wherein said compression bleed disc limits fluid flow through said compression bleed valve assembly.

11. The damper according to claim 8 wherein said compression bleed disc defines a plurality of bleed slots.

12. A damper comprising:
    a pressure tube forming a working chamber;
    a piston disposed within said working chamber, said piston assembly dividing said working chamber into an upper working chamber and a lower working chamber;
    a reservoir tube surrounding said pressure tube, said reservoir tube defining a reserve chamber disposed between said reservoir tube and said pressure tube;
    a compression valve assembly disposed between said lower working chamber and said reserve chamber, said compression valve assembly comprising a valve body secured to said pressure tube and a retainer extending through said valve body, said valve body defining a compression fluid passage extending between said lower working chamber and said reserve chamber, said compression valve assembly controlling fluid flow through said compression fluid passage; and
    a compression bleed valve assembly attached to said retainer, said compression bleed valve assembly including a ported plate disposed adjacent said compression valve assembly, said ported plate and said retainer defining a compression bleed passage extending between said lower working chamber and said reserve chamber, said compression bleed valve assembly further comprising a compression bleed disc disposed adjacent said ported plate, said compression bleed disc defining at least one slot in communication with said compression bleed passage for limiting fluid flow through said compression valve assembly for tuning said damper.

13. The damper according to claim 12 wherein said compression bleed valve assembly includes a compression low speed valve disc disposed adjacent said compression bleed disc, said compression low speed valve disc and said ported plate defining a chamber in communication with said at least one slot defined by said compression bleed disc, deflection of said compression low speed valve disc being controlled by said compression bleed disc.

\* \* \* \* \*